June 4, 1957  G. L. WARSACK  2,794,212
MATERIAL TREATING SYSTEM AND APPARATUS
Filed Aug. 19, 1954  5 Sheets-Sheet 1
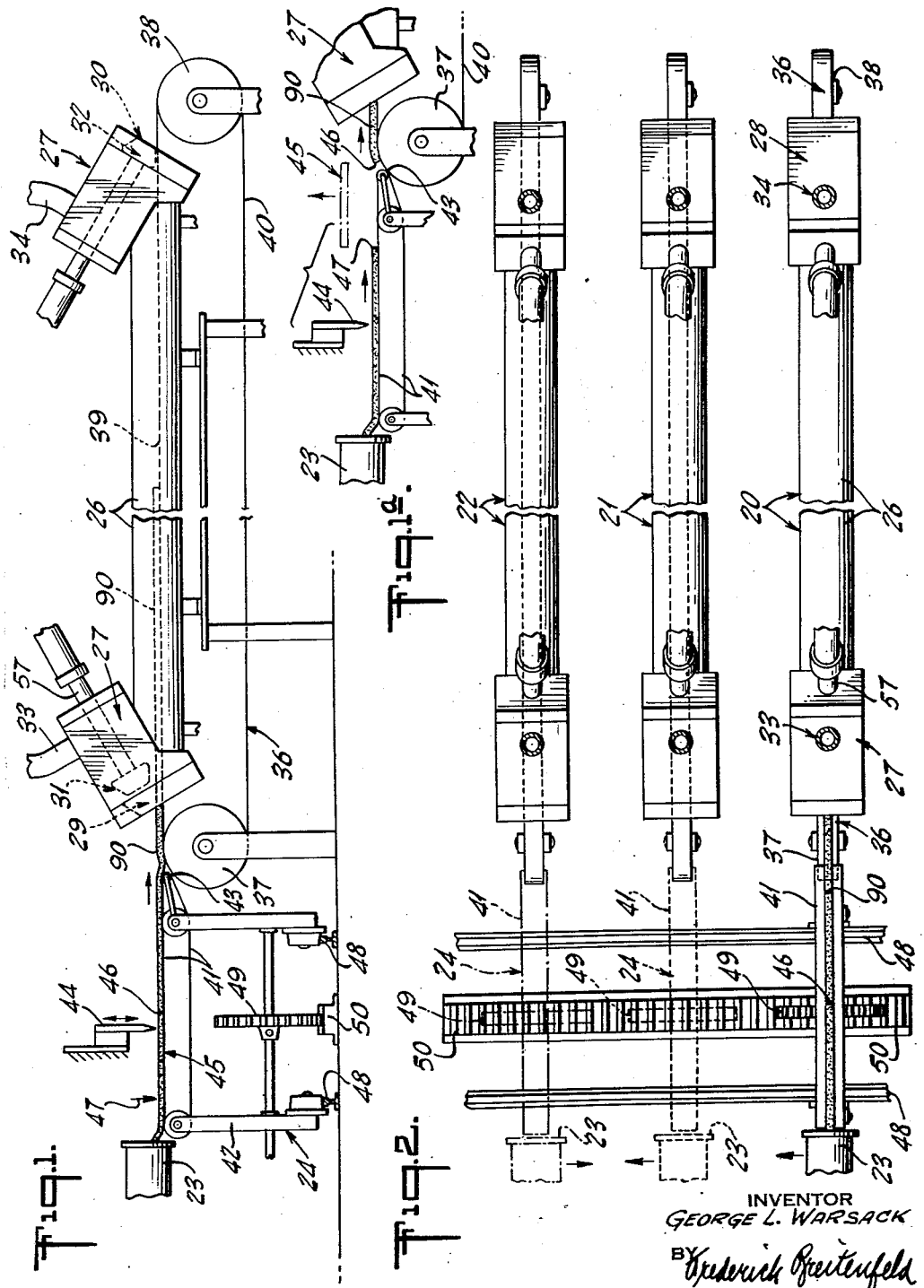
INVENTOR
GEORGE L. WARSACK
BY Frederick Breitenfeld
ATTORNEY

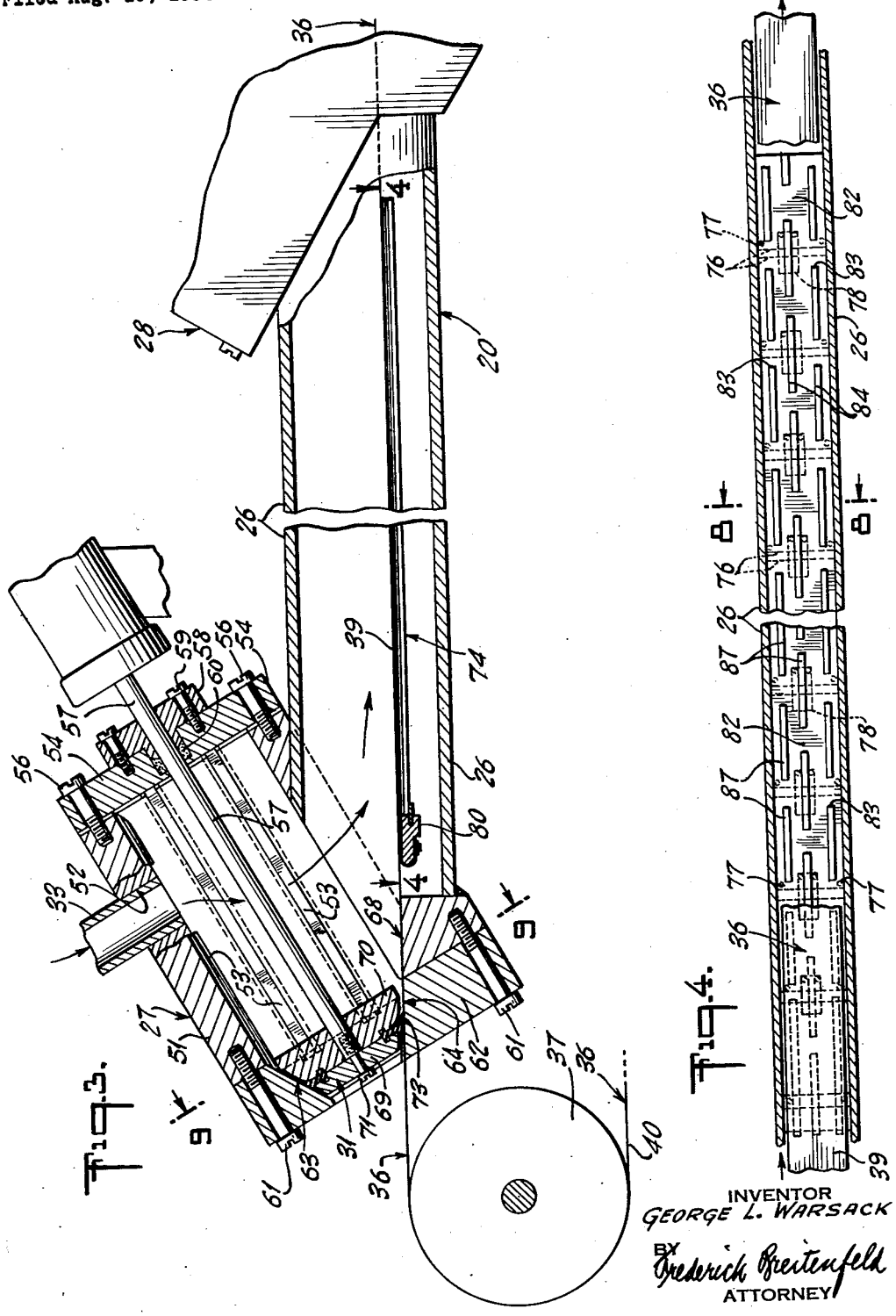

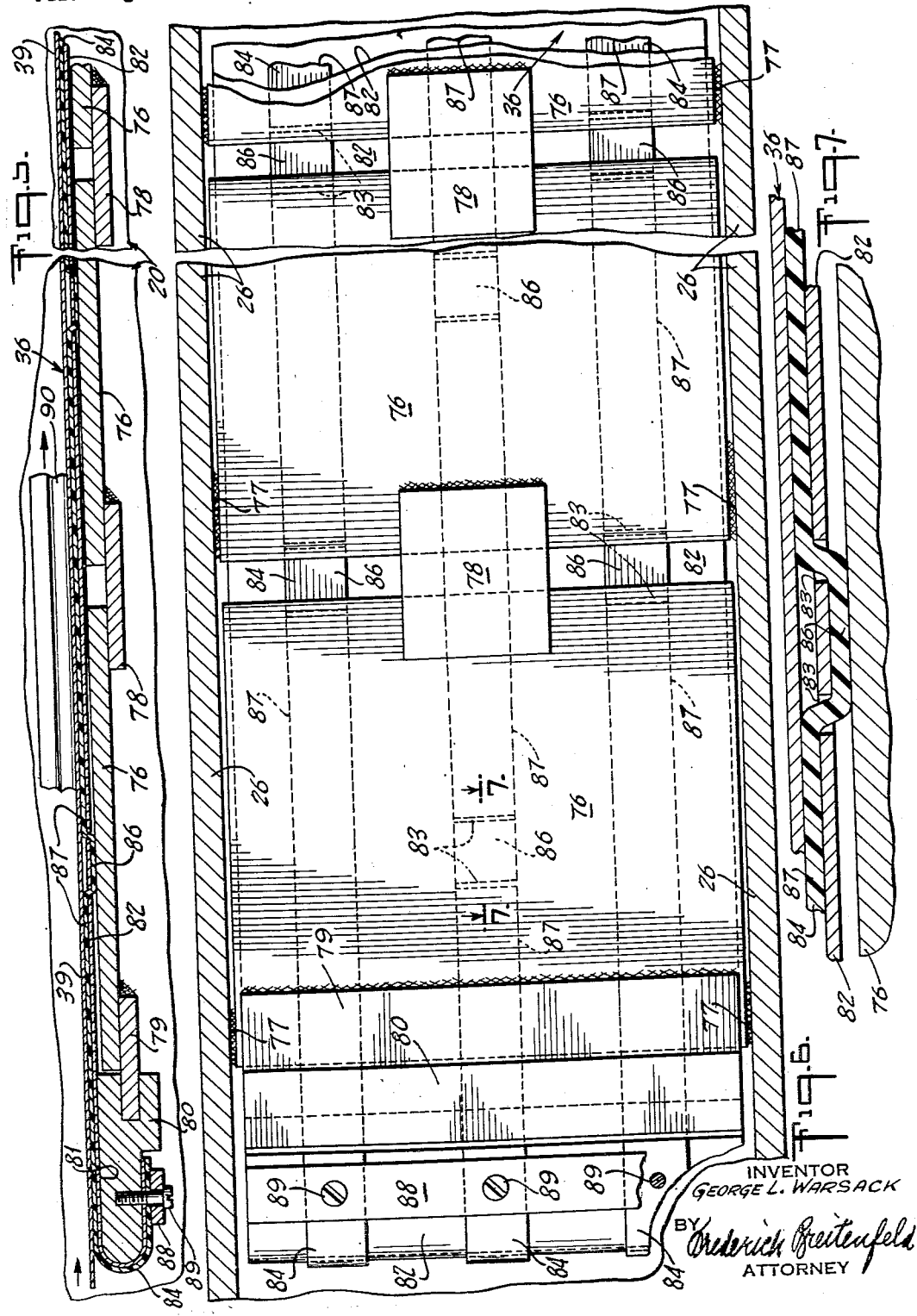

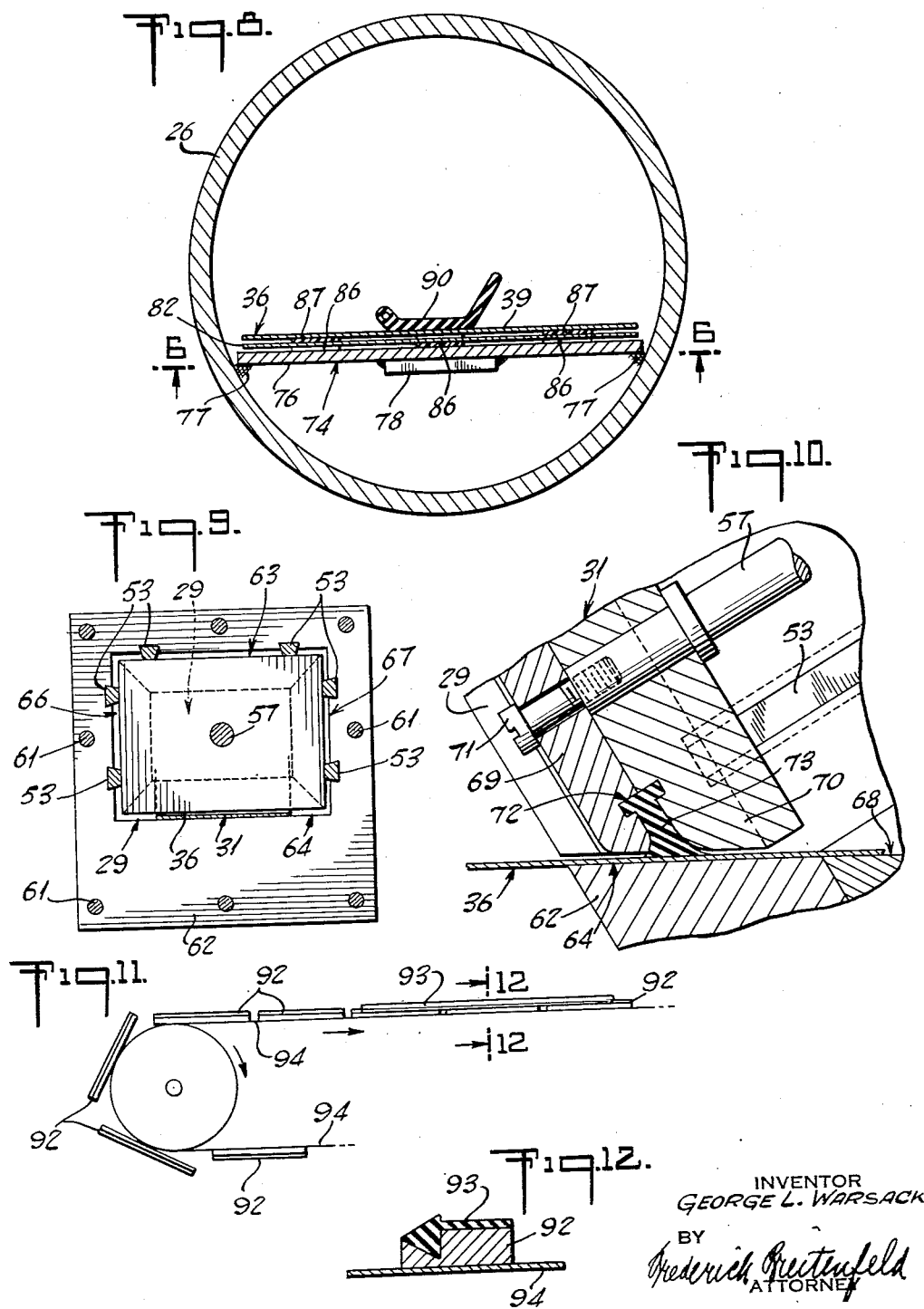

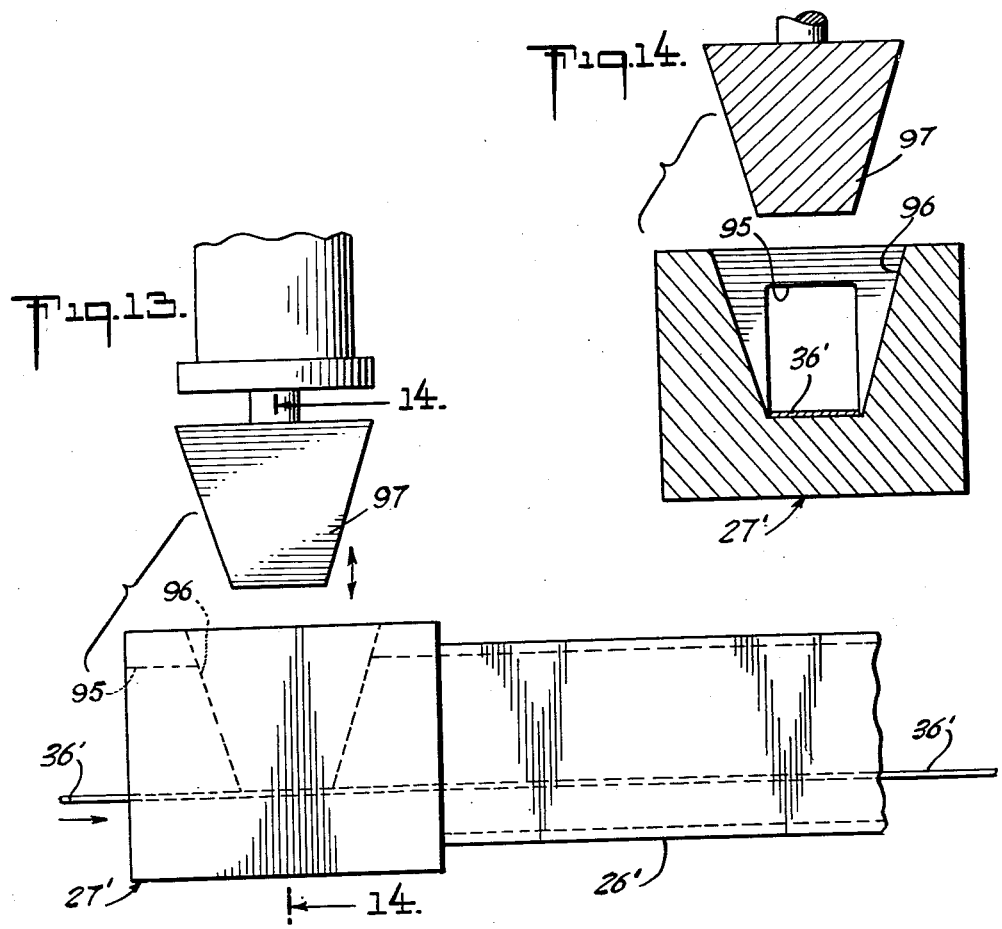

United States Patent Office 2,794,212
Patented June 4, 1957

2,794,212

MATERIAL TREATING SYSTEM AND APPARATUS

George L. Warsack, Port Clinton, Ohio, assignor to The Kon-Kure Company, Detroit, Mich., a partnership Application August 19, 1954, Serial No. 451,031

20 Claims. (Cl. 18—6)

This invention relates generally to material treating systems and apparatus, and has particular reference to a new method and equipment for treating lengths of material of a soft, easily deformed or plastic character. The invention is especially concerned with those processes in which elongated masses of such material are transported in a plastic condition from a forming device to a treating chamber, then subsequently discharged from the latter.

While such procedures may have wide application in industry, the present invention was primarily developed for, and has been successfully employed in, the curing of rubber. Accordingly, it will be described hereinafter with particular reference to that process. However, it is to be understood that the invention is equally applicable to, and is intended to include, other similar operations.

Heretofore in the rubber industry, it has been the practice to cut extruded lengths of soft rubber into relatively short lengths, and manually to lift such lengths and place them into trays or pans, the trays being then transported to and deposited in curing ovens, and later removed and cooled. This method not only requires considerable time-consuming and uneconomical manual handling, both of the trays and the extruded forms, but limits the manufacture of extrusions to relatively short readily manipulable lengths. Further, shrinkage and distortion during curing causes a loss of 6% or more from each extrusion, in addition to the damage and deformation resulting from the hand operations.

In accordance with the present invention, the extruded material is directly, without handling, transported from the extruder or other point of origin to and into the curing or analogous treatment chamber, the chamber is then closed and the material cured, and subsequently the chamber is opened and the cured material discharged. The nature of the invention is such that the length of the treating chamber may be of any desired extent. For example, chambers have been built and successfully operated to accommodate extrusions up to 200 feet long. The strand is supported throughout its entire length during its transportation and during the curing operation, whereby deformation of the relatively soft material is almost completely avoided. Moreover, the lengths involved have been found to eliminate shrinkage almost entirely. Further, relatively complex cross-sectional shapes may be produced by the present method as there is no manual handling of the soft material.

The invention provides additional advantages in permitting continuous extruder operation with a minimum of waste, thus contributing to a high output rate of treated material. This desirable result is accomplished by successively feeding extruded lengths to a plurality of treatment vessels, so that, for all practical purposes, the output rate is limited only by the speed of extrusion.

In accordance with my invention, I provide a treatment vessel having a conveyor extending through it, and a special means for closing the vessel. More particularly, a closure member of special construction and mode of functioning is movable into and out of a vessel-closing position in which it engages with the conveyor itself to seal the vessel. Obviously, this facilitates the feeding of material to be treated into the vessel and the withdrawing of treated material from the vessel.

Other objects of the invention will become apparent upon reading the following specification and referring to the accompanying drawings, which form a material part of this disclosure. The invention consists, in brief, in the features of construction, and the combinations and arrangements of elements and method steps, exemplified in the accompanying drawings and hereinafter described. In the drawings:

Figure 1 is a side elevational view of a material treating system and apparatus embodying the features of the present invention;

Figure 1a is a partial side view similar to Figure 1 illustrating the material feeding operation of the invention at a slightly later stage;

Figure 2 is a top plan view of Figure 1, showing in dashed and dot-and-dashed outline successive positions of the material feeding apparatus;

Figure 3 is an enlarged longitudinal sectional view of a treatment vessel and a closure member constructed in accordance with the invention;

Figure 4 is a horizontal sectional view taken substantially along the line 4—4 of Figure 3, showing some details of a conveyor supporting table within the treatment vessel;

Figure 5 is a fragmentary, longitudinal sectional view, greatly enlarged, showing constructional details of the conveyor supporting table;

Figure 6 is a horizontal view from underneath taken substantially along the line 6—6 of Figure 8;

Figure 7 is a fragmentary sectional view taken substantially along the line 7—7 of Figure 6;

Figure 8 is a transverse sectional view substantially along the line 8—8 of Figure 4;

Figure 9 is a transverse sectional view substantially along the line 9—9 of Figure 3;

Figure 10 is a fragmentary, longitudinal sectional view similar to Figure 3, but greatly enlarged, to more clearly show the sealing engagement of the closure member with the conveyor belt;

Figure 11 is a schematic, elevational view showing a slightly modified form of conveyor adapted to fully support extrusions of unusual shapes;

Figure 12 is a sectional view taken substantially along the line 12—12 of Figure 11;

Figure 13 is a partial, somewhat schematic side elevational view showing a slightly modified form of treatment vessel closure;

Figure 14 is a sectional view taken substantially along the line 14—14 of Figure 13;

Figure 15 is a partial, somewhat schematic side elevational view showing another form of treatment vessel closure; and Figure 16 is a sectional view taken along the line 16—16 of Figure 15.

The system illustrated in Figures 1 and 2 comprises a plurality of treatment vessels, generally designated 20, 21 and 22, an extruder 23 or other device for forming material in elongated pieces, and a transfer mechanism 24 for conveying the elongated material to the treatment vessels. While the material forming device 23 will hereinafter be referred to as an extruder, it is to be understood that other devices, such as a rolling mill, may also be used to shape material in elongate form, and that the term "extruder" is intended to include all of such devices.

The treatment vessels 20, 21 and 22 are all of the same construction, so that a description of one will suffice. The vessel 20 includes a generally horizontal tubular or cylindrical member 26 having oblique housings 27 and 28 at its opposite ends. The housings 27 and 28 are formed with openings 29 and 30 in substantial alignment with the tubular portion 26; and closure members 31 and 32 are mounted in the housings for movement into and out of closing relation with respect to the aligned openings. Inlet and outlet conduits 33 and 34 communicate through the housings 27 and 28 with the interior of the tubular member 26 for introducing steam or other processing fluid into the vessel and withdrawing the fluid from it.

A conveyor, generally designated 36, extends through the tubular member 26 and through openings 29 and 30 for carrying material into and out of the treatment vessel. The conveyor 36 is of the endless belt type and is mounted upon a pair of supporting rollers 37 and 38 arranged adjacent to and exteriorly of the treatment vessel. The belt 36 has an upper stretch or lap 39 extending through the treatment vessel and out of its opposite ends, and a lower stretch or return lap 40 entirely on the outside of the vessel. Movement of the belt 36 is normally in a clockwise direction (as viewed in Figure 1) so that material on the upper lap adjacent to the roller 37 will be carried inwards through the vessel opening 29 and ultimately outwards through the vessel opening 30.

Batch processing of material delivered to the receiving end of the conveyor 36 is effected by stopping conveyor belt movement when the material is entirely within the treatment vessel, and moving the closure members 31 and 32 into their vessel-closing positions, in sealing engagement with the conveyor belt. Steam or other processing fluid is then introduced under pressure through one of the conduits 33 and 34 to effect curing or other desired treatment of the material in the vessel. If desired, the vessel may be inclined slightly to permit the processing fluid entering from one end to force residual air out of the other end. After the required processing time, the fluid may be exhausted from the treatment vessel, the closure members 31 and 32 moved to their open positions away from the conveyor belt, and clockwise movement of the belt resumed to deliver the treated material at the discharge end of the vessel.

The transfer mechanism 24 for carrying material from the extruder 23 to the receiving end of the treatment vessel conveyor 36 includes a substantially horizontal endless belt conveyor 41 mounted on rollers carried by a frame 42. The belt 41 has its receiving end adjacent to the extruder 23, permitting the latter to deposit material on the belt, and has its delivering end extending around a relatively small roller 43 for supporting the delivery end of the belt 41 as close as possible to the belt 36.

A cutter 44 is mounted for action above the transfer belt 41 and functions to sever the extruded material into predetermined lengths. Each length may be as long as the treatment vessel will permit. The cutter 44 is timed to make spaced pairs of relatively close cuts, as at 46 and 47, to sever and facilitate removal of the extruded material 45 lying between the adjacent lengths to be treated. Obviously, the cuts 46 and 47 may be effected simultaneously by a double knife cutter, if desired.

The transfer mechanism 24 and the extruder 23 are mounted on tracks 48, 48 for rolling movements transversely of the treatment vessels. A gear 49 is mounted in the frame 42 for driving engagement with a rack 50 to effect movement of the transfer mechanism and extruder along the tracks 48. As best seen in Figure 2, the treatment vessels 20, 21 and 22 are arranged with the receiving ends of their conveyors in an adjacent array, so that the transfer mechanism 24 may be moved to bring its delivery end into close cooperative relation, in succession, to the receiving ends of the treatment vessel conveyors, as indicated by the dashed, and the dot-and-dashed, positions shown in Figure 2.

More particularly, after a length of the extruded material is fed into one of the treatment vessels, say vessel 20, as described hereinabove, the transfer mechanism 24 and extruder 23 will move transversely to the dashed line position of Figure 2, during which movement the severed material 45 lying between the cuts 46 and 47 will be removed from the conveyor 41. The extruded material will then be fed into the treatment vessel 21 and ultimately the cutter 44 will make another pair of closely spaced cuts to define the end of one length and the beginning of another. The transfer mechanism 24 is then moved to the dot-and-dash line position where the feeding procedure is repeated with respect to the vessel 22. During movement between the dashed and dot-and-dashed positions the severed material between the pair of cuts is removed, as before (see Figure 1A). At the dot-and-dash line position the extruded material is again formed with a pair of cuts defining the end of one length and the beginning of another.

During the above-described feeding operation with respect to the vessels 21 and 22, the vessel 20 completes its curing action, whereupon the closure members 31 and 32 move to their open positions and the conveyor 36 moves to discharge the cured material from the discharge end of the vessel. The vessel 20 is then ready to receive another length of extruded material from the transfer mechanism, and in fact the entry of the new length may take place simultaneously with the discharge of the treated length. The same procedure is followed in connection with the vessels 21 and 22 as they complete their curing actions.

Obviously there may be more than three treatment vessels, and they need not necessarily be arranged in parallel relationship. A radial arrangement might be provided, with their receiving ends in an adjacent array, ready to receive, in succession, the lengths of material delivered by the transfer mechanism as it moves intermittently from one station to the next.

In Figure 3 is shown a detailed view of the treatment vessel 20 and its end housing 27. The housing 27 includes an open ended tubular member 51, illustrated as being of rectangular cross section, and secured, as by welding, to one end of the vessel 26, in inclined relation to the latter. The housing member 51 opens into the vessel 26 and is formed with an opening 52 adapted to receive an inlet conduit 33. The side and top walls of the housing member 51 are provided on their inner surfaces with longitudinally extending guide strips or runners 53, preferably formed of low-friction, wear-resistant material, for guiding the closure member 31 toward and away from the opening 29. The guide strips 53 may be trapezoidal in section (Figure 9) and project into the housing member 51 to afford a minimum of frictional resistance to closure member movement.

A top plate 54 is secured over the upper end of the housing member 51, as by bolts 56 or other suitable securing means, and an exteriorly actuated piston rod 57 extends slidably through the top plate 54 in oblique relation to the treatment vessel and its conveyor. A retaining plate 58 is circumposed about the piston rod 57 and secured to the housing top plate 54, as by bolts 59, to maintain a quantity of packing 60 in position about the longitudinally reciprocal piston rod.

Secured, as by bolts 61, to the lower end of the oblique housing member 51 is a plate 62 which defines the material-receiving, vessel inlet opening 29. The opening 29 is defined by a plurality of substantially flat, internal walls converging toward the exterior of the vessel. These walls are upper and lower walls 63 and 64 (see Figure 9), and side walls 66 and 67, and they conform in shape to a truncated pyramid whose axis is oblique to the vessel 26. The lower wall 64 is substantially horizontal, and flush with the internal surface 68 of the housing member 51.

The closure member 31 is of corresponding truncated pyramidal shape, and is formed of a pair of plates 69 and 70 secured together and to the rod 57 by the bolt 71. Extending about the periphery of the plug-like closure member 31, and conjointly defined by the plates 69 and 70, is a recess 72 in which is seated a yieldable gasket 73 fabricated of any suitable material. Of course, the gasket can be removed and replaced by detaching the plate 69 from the rod 57.

As best seen in Figures 3 and 10, the upper lap 39 of the conveyor belt 36 passes in conforming proximity to the lower wall 64 of the opening 29. That is, the belt is substantially flat, and slides along the substantially flat lower wall 64. Hence, the vessel opening 29 may be closed by moving the plug-like closure member 31 into the opening so that the gasket 73 will conformably engage the walls of the opening and the upper surface of the conveyor belt itself to effectively seal the opening. Internal pressure in the vessel will serve to increase the sealing effect of the plug-like closure member in the opening to prevent the escape of processing fluid. This sealing engagement of the closure 31 with the upper lap of the conveyor belt is best seen in Figure 10.

Extending longitudinally within the vessel 26, and having its upper surface substantially coplanar with the lower wall 64 of the opening 29, is a table 74 slidably supporting the upper lap 39 of the conveyor 36 with a minimum of frictional resistance. In order that the table 74 remain horizontal and free from distortion during relatively great temperature variations interiorly of the treatment vessel, it is constructed in a special manner, as best illustrated in Figures 5–8.

The conveyor supporting table 74 includes a plurality of horizontal longitudinally spaced supporting plates 76 arranged in a common plane, each having its side edges secured in a restricted region, as by welds 77, to the adjacent portions of the vessel 26. That is, the side edges of each plate 76, adjacent to one end thereof (the left end as seen in Figure 6) are fixedly secured to the vessel, and the other end remains unsecured. Underlying and bridging the space between each adjacent pair of supporting plates 76 are a plurality of relatively small plates 78 each fixedly secured, by welding or otherwise, to one of the adjacent plates 76, at the rigidly secured end of the latter. Thus, in Figure 6, each of the bridging plates 78 shown in this Figure is welded at its right-hand edge to the left-hand end of the adjacent supporting plate 76. Each of the bridging plates 78 has its other end disposed in underlying, sliding supporting engagement with the free end of the other adjacent plate 76. By this construction, the plates 76 may expand into the spaces therebetween, by sliding engagement with the plates 78, without buckling out of their horizontal, coplanar relation.

Fixedly secured to the under side of the plate 76 closest to the receiving end of the treatment vessel (the leftmost plate 76 in Figures 5 and 6), is a horizontal, transversely extending bar or strip 79, which projects beyond the left end of the supporting plate. An anchoring body 80 is fixed to the strip 79 and has its upper surface 81 slightly above the upper surfaces of the supporting plates 76.

A relatively thin, apertured strip 82, preferably fabricated of stainless steel to afford substantial stiffness, is superposed over the supporting plates 76 to extend longitudinally within the vessel 26. The strip 82 is formed with slots or apertures 83 arranged in a plurality of longitudinal rows, the slots of each row being arranged in longitudinally spaced pairs staggered with respect to the slot pairs of the adjacent row. A plurality of longitudinal, flexible strips or tapes 84 are woven through the slots 83, each tape extending below the strip 82 between the slots of one pair, as at 86 (Figure 7), and extending above the strip between spaced pairs of slots, as at 87. Thus, the tape portions 86 rest on the supporting plates 76 and support the strip 82 above these plates, while the tape portions 87 provide a plurality of spaced, raised areas or lands on the upper side of the strip. The tape portions 87 are substantially coplanar with the horizontal surfaces 64 and 68 and slidably support the upper stretch 39 of the conveyor belt 36. The tapes 84 are composed of a low friction material, such as the plastic known as "Teflon."

It will be understood that the provision of an antifriction surface, or series of surfaces, for the conveyor 36 to rest on, does not necessarily require that a set of elongated tapes, such as those illustratively shown at 84, be employed. Other means will readily suggest themselves, as by mounting a series of spaced "lands" on the upper surface of a strip such as that shown at 82.

As noted hereinbefore, movement of the upper belt lap 39 is toward the right, as seen in Figures 5 and 6. In order to prevent shifting of the strip 82 and the tapes 84 under the force of the moving conveyor belt, the left ends of this strip and of the tapes are turned under the fixed body 80 and anchored to the latter, as by the bar 88 and fasteners 89 (see Figure 5).

While the flat belt of the conveyor 36, illustrated in Figures 1–10, is suitable for carrying most conventional extrusions, such as that shown at 90 in Figure 8, there are many extrusions of such cross-sectional configuration that they are incapable of sustaining themselves on a flat surface. In Figures 11 and 12 is shown a modified form of conveyor 94 provided on its external surface with groups of specially shaped supporting blocks 92. As seen in Figure 12, the blocks 92 are shaped to conformably engage with and support the extrusion 93 and prevent deformation of the latter. The blocks 92 are relatively small, to permit free turning movement about the conveyor rollers, and are separated in groups to permit sealing engagement of the vessel closure member or members with the belt 94. If desired, the blocks may be fabricated of flexible material, such as rubber or the like, and each group formed as an integral unit. In this construction, the flexibility of the material will permit turning movement about the conveyor rollers.

While the internal, plug-like closure member described hereinbefore is desirable for many reasons, other types of end housings and closures may also be employed. In Figures 13 and 14 I have illustrated a housing 27' having a through opening 95 formed therein in alignment with the axis of the vessel 26'. The belt 36' enters the vessel through this opening. In addition, the housing 27' opens upwardly, as at 96, defining a recess shaped like an inverted truncated pyramid. A closure member 97 is mounted above the housing 27' for vertical reciprocatory movement through the housing opening 96 into and out of a vessel-closing position. That is, the closure member 97 is movable downwards through the opening 96 into a position extending across and seated in the passageway 95. Further, the closure member bears against the upper lap of the belt 36', in sealing engagement therewith; and since the belt is in conforming engagement with the bottom wall of the passage-way 95, it will be understood that the closure member 97 effects complete sealing of the passageway. Of course, the closure member may be provided with gaskets, as may be required.

In Figures 15 and 16 is shown another modification of the end housing and closure member, wherein the end housing 27" includes a passageway 98 in alignment with the vessel 26". An outwardly extending ledge or shelf 99 has its upper surface adapted to support the upper lap of the conveyor belt 36". An L-shaped closure member 100 is mounted exteriorly of the treatment vessel for reciprocatory movement in an oblique direction relative to the conveyor travel between the full and dashed line positions. In its closed position, the upright part 101 of the closure member 100 extends across the passageway 98 and engages with the housing 27", while the horizontal part 102 bears downward against the conveyor belt 36" and maintains the latter tight against the upper surface of the ledge 99. This form of housing and closure member has the advantage of simplicity of construction and absence of sliding engagement between closure member and housing.

Although the invention has been described in some detail by way of illustration and example for purposes of clarity of understanding, it is understood that changes and modifications in details may be made by those skilled in the art without necessarily departing from the spirit of the invention and the scope of the appended claims.

Having thus described my invention and illustrated its use, what I claim as new and desire to secure by Letters Patent is:

1. In a material treating system, a treatment vessel into which material to be treated is moved, said vessel having opposite open ends, a conveyor extending through said vessel and out of its ends and movable to carry material into and out of said vessel, said conveyor being in conforming proximity to a wall of the opening at at least one end of the vessel, and a closure member at said end movable into and out of a vessel-closing position and shaped to effect sealing of said opening by engagement with the conveyor itself.

2. In a material treating system, the structure defined in claim 1, said conveyor being an endless loop whose return lap is exterior with respect to said vessel.

3. In a material treating system, the structure defined in claim 1, said conveyor being a flat belt, and the wall with which it conforms being a flat bottom wall of said closable end opening.

4. In a material treating system, the structure defined in claim 1, said closure member being mounted for reciprocating movement along a direction oblique to the direction of movement of said conveyor.

5. In a material treating system, a treatment vessel having closed sides and opposite open ends constituting entrance and exit openings for the material to be treated, a conveyor extending through said vessel and out of its ends and movable to carry material into and out of said vessel, the opening at at least one end of the vessel having walls converging toward the exterior of the vessel, said conveyor being in conforming proximity to one of said walls, and a plug-like closure member in the interior of the vessel at said end and having correspondingly convergent surfaces and mounted for reciprocating movement into and out of a vessel-closing position in which one surface of the closure member effects sealing engagement with a surface of the conveyor on which the material is supported.

6. In a material treating system, the structure defined in claim 5, in which the movement of said closure member is along a direction oblique to the direction of conveyor travel.

7. In a material treating system, the structure defined in claim 5, in which the closure member is mounted for movement within a housing forming part of said vessel and provided with guides constraining the closure member to a movement along a direction oblique to the direction of conveyor travel.

8. In a material treating system, a treatment vessel having opposite open ends, a flat conveyor extending through said vessel and out of its ends and movable to carry material into and out of said vessel, the opening at at least one end of the vessel having walls conforming to a truncated pyramid whose axis is at an angle to the direction of conveyor travel, one of said walls being coplanar with said conveyor, said conveyor being in contact with said wall, and a closure member at said end having a corresponding truncated pyramidal shape and mounted for reciprocating movement along the direction of the pyramid axis into and out of a vessel-closing position in which one surface of said closure member effects sealing engagement with the conveyor itself.

9. In a material treating system, a treatment vessel having opposite open ends, a conveyor extending through said vessel and out of its ends, said conveyor being in conforming proximity to a wall of the opening at each end of the vessel, said conveyor being movable to carry material into said vessel through one end and out of said vessel through the other, and a closure member at each end movable into and out of a vessel-closing position and shaped to effect sealing engagement with said conveyor, whereby said vessel may be closed for treatment of material therein and opened for removal of treated material therefrom.

10. In a material treating system, the structure defined in claim 9, said conveyor being an endless loop comprising upper and lower laps, the upper lap being within the vessel and the lower lap in exterior relation thereto, said upper lap having exterior ends of appreciable extent to receive material to be treated and deliver it after treatment.

11. In a material treating system, a treatment vessel having opposite open ends, a flat belt conveyor extending through said vessel and out of its ends and movable to carry material into and out of said vessel, and a supporting table within said vessel beneath said conveyor, said table including spaced raised areas of low-friction material underlying the conveyor and supporting the latter for free sliding movement thereof.

12. In a material treating system, a treatment vessel having opposite open ends, a flat belt conveyor extending through said vessel and out of its ends and movable to carry material into and out of said vessel, and a supporting table within said vessel beneath said conveyor, said table including a perforated band having strips of flexible low-friction material woven back and forth through said perforations to define spaced raised areas adapted to support the conveyor in free sliding relation thereto.

13. In a material treating system, a treatment vessel having closed sides and opposite open ends, a flat belt conveyor extending through said vessel and out of its ends and movable to carry material into and out of said vessel, and a supporting table within said vessel beneath said conveyor, said table including a plurality of plates in coplanar spaced relation, each of said plates having one end fixed to said vessel while the other end is free to allow expansion and contraction of said plates, and a bridging member secured to each plate at its fixed end and extending into underlying supporting relation to the free end of the adjacent plate.

14. In a material treating system, a treatment vessel having opposite open ends, a flat belt conveyor extending through said vessel and out of its ends and movable to carry material into and out of said vessel, and a supporting table wthin said vessel beneath said conveyor, said table comprising a plurality of plates arranged in coplanar spaced relation, each plate being secured to the vessel only in a restricted region to allow expansion and contraction of the plates without impairment of said coplanar relation, and a continuous band resting upon said plates and provided with spaced raised areas of low-friction material underlying the conveyor and affording free sliding support for the latter.

15. In a material treating system, a plurality of treatment vessels each of which has opposite open ends one of which is a receiving end and the other a discharge end, a conveyor extending through each vessel and out of its ends and movable to carry material to be treated into the vessel through one end and to carry the treated material out of the vessel through the other end, said treatment vessels being arranged with the receiving ends of said conveyors in an adjacent array, an extruder positioned in front of said treatment vessels and adapted to dispense a continuous length of material to be treated in the general direction of said vessels, a transfer mechanism including a transfer conveyor between said extruder and said vessels, said transfer conveyor having a rear end in receptive relation to the extruder and a forward end adjacent to said vessels, and means supporting said transfer mechanism for movement to bring its forward end successively into operative relation to the receiving ends of said treatment vessel conveyors.

16. In a material treating system including a plurality of open-ended batch treatment vessels and a continuously operating extruder that dispenses a continuous length of material to be treated, the method which comprises: continuously conveying said material from said extruder toward successive treatment vessels in sequence, introducing a selected length into each vessel through the proximate end thereof, and in each case closing the ends of the treatment vessel after the batch has been introduced, treating the enclosed material, opening the ends of the vessel, and removing the treated material through the distal end to prepare the vessel for the reception of the next batch.

17. The method defined in claim 16, in which predetermined lengths of untreated material are withdrawn at predetermined intervals from the continuously extruded length to compensate for the time lag between the conclusion of material introduction into one treatment vessel and the commencement of material introduction into the next.

18. In a material treating system, a treatment vessel in the form of a cylindrical chamber open at its opposite ends, a conveyor belt having a stretch extending through said vessel and movable to carry material into and out of the vessel, said stretch of the belt forming a material-supporting floor for the vessel, and closure means at at least one of the end openings and operative against the material-bearing surface of the belt for closing said opening.

19. In a material treating system, a treatment vessel in the form of an elongated tubular chamber open at its opposite ends, a conveyor belt having a stretch extending longitudinally through said vessel and movable to carry material into and out of the vessel, said stretch of the belt forming a material-supporting floor for the vessel, means for advancing the belt intermittently, and closure means at at least one of the end openings and operative against the belt for closing said opening when the belt is at rest.

20. In an apparatus of the character described, a plurality of treating vessels arranged in side-by-side and spaced relation, material extruding means from which lengths of the material emanate, a conveyor interposed between the extruding means and the vessels and adapted to receive successive lengths of material as they are fed from the extruding means, means for moving the conveyor in a direction transverse to the direction of feed of the material from the extruding means to thereby enable the conveyor to feed lengths of the material successively into said vessels, conveying means operative through each vessel, each vessel having an entrance and an exit opening, and means at each opening for closing the same to confine material in the vessel for treatment.

References Cited in the file of this patent

UNITED STATES PATENTS

| | | |
|---|---|---|
| 1,014,192 | Williams | Jan. 9, 1912 |
| 1,608,690 | Ashenhurst | Nov. 30, 1926 |
| 1,895,533 | Bagley | Jan. 31, 1933 |
| 2,125,001 | Cowen et al. | July 26, 1938 |
| 2,135,763 | Nicholson | Nov. 8, 1938 |
| 2,154,791 | Wallace | Apr. 18, 1939 |
| 2,403,476 | Berry et al. | July 9, 1946 |
| 2,619,675 | Woolff | Dec. 2, 1952 |